United States Patent
Flynn

[19]

[11] Patent Number: 6,137,643
[45] Date of Patent: Oct. 24, 2000

[54] THERMAL ASPERITY DETECTION WITH LONG MAGNET REJECTION FOR DIRECT ACCESS STORAGE DEVICE (DASD)

[75] Inventor: David Timothy Flynn, Rochester, Minn.

[73] Assignee: International Business Machines Corporation, Armonk, N.Y.

[21] Appl. No.: 09/167,050

[22] Filed: Oct. 6, 1998

[51] Int. Cl.[7] .................................. G11B 5/02; G11B 5/09
[52] U.S. Cl. ................................................. 360/25; 360/46
[58] Field of Search ........................................ 360/25, 46

[56] References Cited

U.S. PATENT DOCUMENTS

| | | |
|---|---|---|
| 4,786,890 | 11/1988 | Marcus et al. . |
| 5,196,849 | 3/1993 | Galbraith . |
| 5,233,482 | 8/1993 | Galbraith et al. . |
| 5,844,920 | 12/1998 | Zook et al. ........................ 371/40.14 |
| 6,018,428 | 1/2000 | Okamura ................................. 360/25 |
| 6,038,091 | 3/2000 | Reed et al. .............................. 360/46 |

*Primary Examiner*—W. Chris Kim
*Attorney, Agent, or Firm*—Joan Pennington

[57] ABSTRACT

A method and apparatus are provided for thermal asperity detection in a direct access storage device. A data signal is received from a data channel in the direct access storage device. A level threshold comparator compares data samples of the data signal with a selected level threshold. Consecutive zero level data samples are detected. Responsive to each identified data sample above the selected level threshold and not an identified consecutive zero level data sample, a counter value is incremented. The counter value is compared with a predefined count threshold. A thermal asperity event is identified responsive to the counter value above the predefined count threshold.

12 Claims, 5 Drawing Sheets

THERMAL ASPERITY DETECTION WITH LONG MAGNET REJECTION FOR DIRECT ACCESS STORAGE DEVICE (DASD)

FIELD OF THE INVENTION

The present invention relates to methods and apparatus for detecting data, and more particularly to, a method and apparatus for thermal asperity detection in a direct access storage device.

DESCRIPTION OF THE RELATED ART

Direct access storage devices (DASDs) often incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. Typically servo information is provided on one or more disk surfaces for reading by the transducer heads for accurately and reliably positioning transducer heads on the disk surfaces to read and write data.

A partial-response maximum-likelihood (PRML) detection channel advantageously is used to achieve high data density in writing and reading digital data on the disks. U.S. Pat. No. 4,786,890 discloses a class-IV PRML channel using a run-length limited (RLL) code. The disclosed class-IV partial response channel polynomial equals $(1-D^2)$, where D is a one-bit interval delay operator and $D^2$ is a two-bit interval delay operator and the channel response output waveform is described by taking the input waveform and subtracting from it the same waveform delayed by a two-bit interval. A (0,k=3/k1=5) PRML modulation code is utilized to encode 8 bit binary data into codewords comprised of 9 bit code sequences, where the maximum number k of consecutive zeroes allowed within a code sequence is 3 and the maximum number k1 of consecutive zeroes in the all-even or all-odd sequences is 5. Various improvements have been implemented in PRML detection channels in disk drives.

For example, U.S. Pat. No. 5,196,849 issued Mar. 23, 1993 to Richard L. Galbraith and assigned to the present assignee, discloses apparatus and a method for encoding a predefined number of bits of binary data into codewords having a predefined number of bits for PRML data channels. Rate 8/9 block codes having maximum ones and run length constraints $(0,8,12,\infty)$ and $(0,8,6,\infty)$ are disclosed for providing timing and gain control and reduced susceptibility to misequalization effects in PRML detection channels.

U.S. Pat. No. 5,233,482 to Richard L. Galbraith, Gregory J. Kerwin and Joe M. Poss, issued Aug. 3, 1995 to the present assignee, discloses thermal asperity compensation methods and apparatus for data detection in a PRML data channel.

In hard disk drives, a thermal asperity (TA) detector identifies readback signal anomalies that result from the heating of the read element's magnetoresistive stripe as it strikes a disk defect.

An important aspect of the detector design is how to identify very subtle events without also qualifying signals that normally occur in the data pattern. Detectors which qualify a TA by counting consecutive samples that exceed a specified threshold can qualify long magnets as a TA if the threshold is set below the DC baseline. A need exists for an improved method and apparatus for thermal asperity detection in a direct access storage device.

SUMMARY OF THE INVENTION

A principal object of the present invention is to provide an improved method and apparatus for thermal asperity detection in a direct access storage device. Other important objects of the present invention are to provide such method and apparatus substantially without negative effects; and to provide such method and apparatus that overcome some of the disadvantages of prior art arrangements.

In brief, a method and apparatus are provided for thermal asperity detection in a direct access storage device. A data signal is received from a data channel in the direct access storage device. A level threshold comparator compares data samples of the data signal with a selected level threshold. Consecutive zero level data samples are detected. Responsive to each identified data sample above the selected level threshold and not an identified consecutive zero level data sample, a counter value is incremented. The counter value is compared with a predefined count threshold. A thermal asperity event is identified responsive to the counter value above the predefined count threshold.

In accordance with an alternative method of the invention, the level comparator and a consecutive zero level data sample detector are eliminated. A counter value is incremented only on positive level detected sample values. Detected zero level data samples are ignored. The counter value is reset on negative level detected sample values. The counter value is compared with a predefined count threshold. A thermal asperity event is identified responsive to the counter value above the predefined count threshold.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
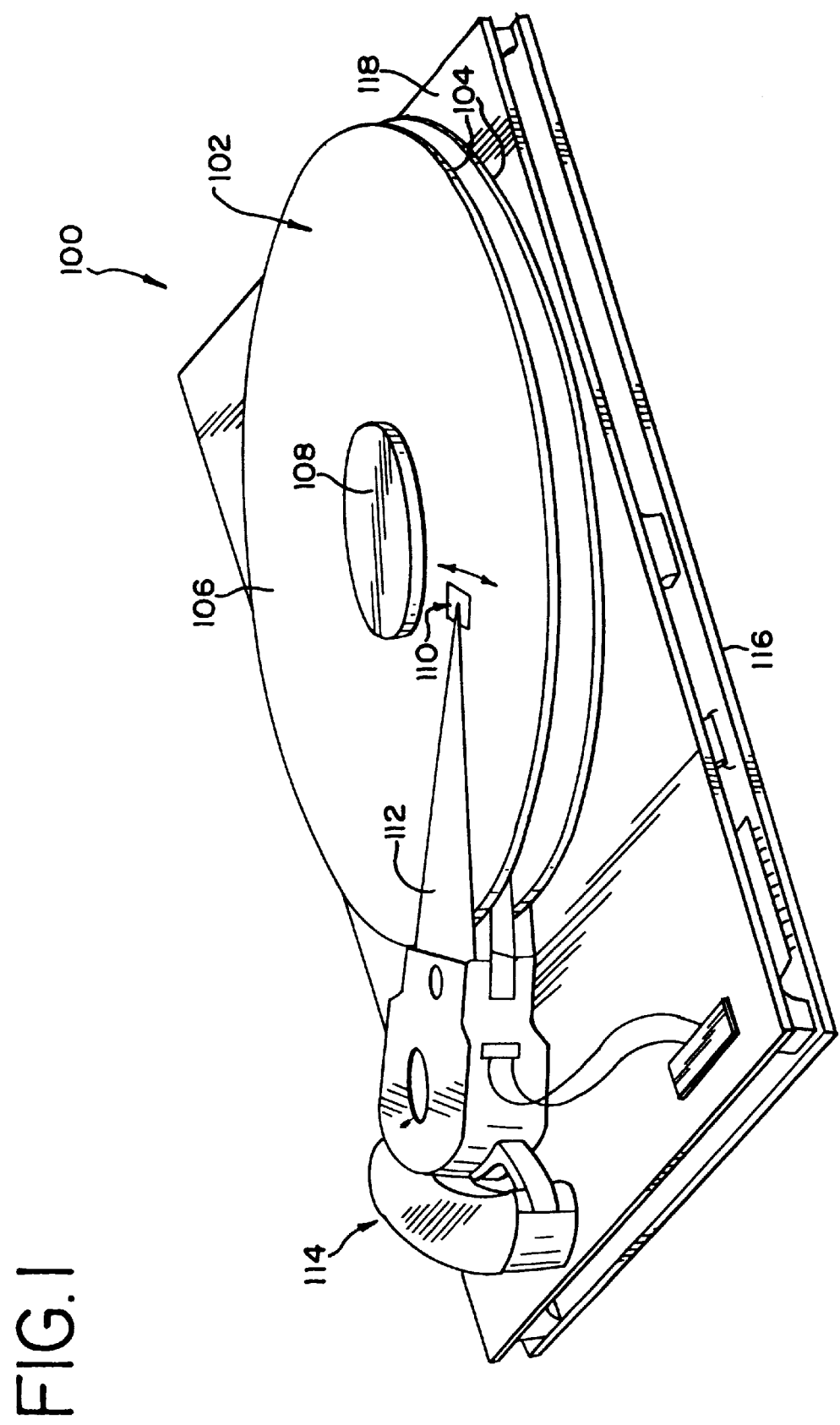
FIG. 1 is a diagrammatic view of a direct access storage device (DASD) embodying the present invention.

Having reference now to the drawings, in FIG. 1 there is illustrated a direct access data storage device (DASD) generally designated as 100 including a stack 102 of disks 104 each having at least one magnetic surface 106. The disks 104 are mounted parallel to one another for simultaneous rotation on and by an integrated spindle and motor assembly 108. Information on each magnetic disk surface 106 is read from or written to the disk surface 106 by a corresponding transducer head assembly 110 movable in a path having a radial component across the rotating disk surface 106.

Each transducer head assembly 110 is carried by an arm 112. The arms 112 are ganged together for simultaneous pivotal movement by a voice coil motor (VCM) magnet assembly 114. Drive signals applied to the VCM magnet assembly 114 cause the arms 112 to move in unison to position the transducer head assemblies 110 in registration with information storage tracks on the disk surfaces 106 where information is written or read. As shown in FIG. 1, an electronics card 116 is mounted together with a base support 118 of DASD 100. The utility of the present invention is not restricted to the details of a particular DASD construction.

Figure 2:
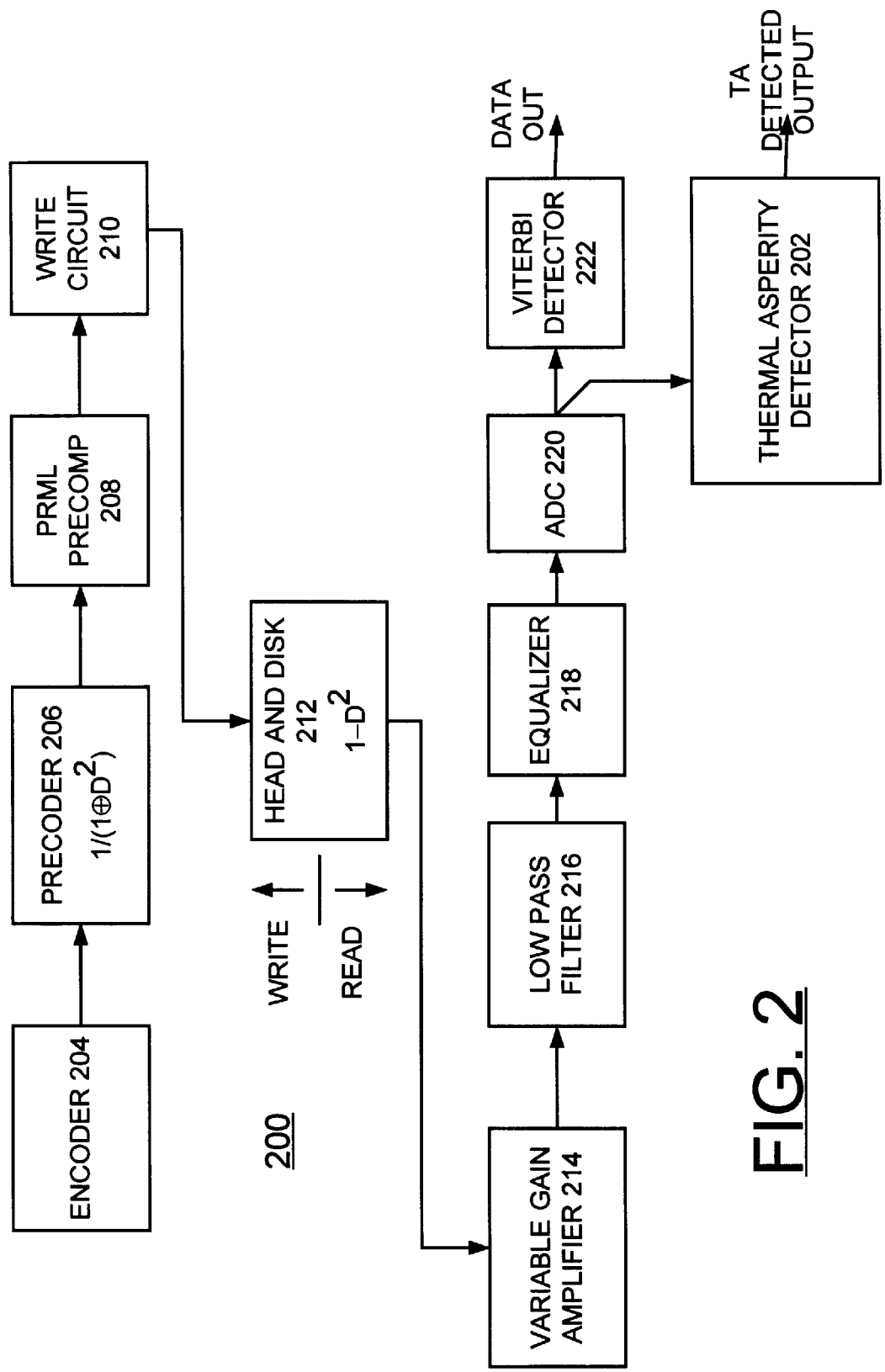
FIG. 2 is a block diagram of a prior art PRML data channel.

Referring now to FIG. 2, there is shown a block diagram of a partial-response maximum-likelihood (PRML) channel 200 available in the DASD 100 including an improved thermal asperity detector 202 of the invention. In accordance with features of the invention, the thermal asperity detector 202 can identify subtle events without also qualifying signals that normally occur in the data pattern. Thermal asperity detector 202 of the preferred embodiment provides long magnet rejection. Thermal asperity detector 202 can qualify a thermal asperity by counting consecutive samples that exceed a specified threshold without qualifying long magnets with the specified threshold set below the DC baseline. Data to be written is applied to an encoder 204 for providing a modulation coded output having predefined run length constraints. A precoder 206 follows the encoder 204 described by a $1/(1 \oplus D^2)$ operation where D is a unit delay operator and the symbol $\oplus$ is used to represent modulo-2 addition. Modulo-2 addition can be thought of as an exclusive or operation. A PRML precomp 208 coupled to the precoder 206 provides a modulated binary pulse signal applied to a write circuit 210 that provides the modulated write current for writing to the disk surface. An analog read signal is obtained at head and disk block 212 described by the $(1-D^2)$ operation. The read signal is applied to a variable gain amplifier (VGA) 214 and the amplified read signal is applied to a lowpass filter 216 and an equalizer 218. The filtered read signal is converted to digital form by an analog-to-digital converter (ADC) 220 that provides, for example, 64 possible 6-bit sampled values. The samples of the ADC 220 are applied to a Viterbi detector 222 and also applied to the thermal asperity detector 202 of the invention. It should be understood that a class IV partial response (PR4) signal or other data detection signal and another type of detector can be used in the data channel 200.

Figure 3:
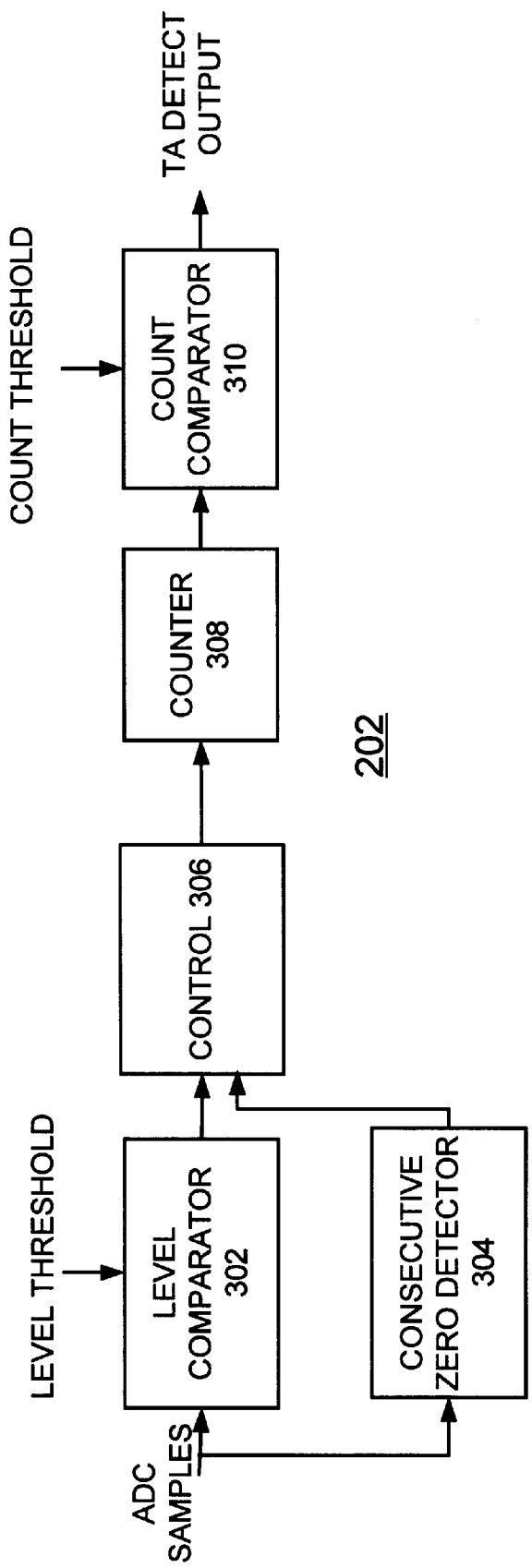
FIG. 3 is a schematic and block diagram representation of a thermal asperity detector of FIG. 2 in accordance with the present invention.

Referring now to FIG. 3, thermal asperity detector 202 includes a level comparator 302 and a consecutive zero detector 304 receiving the ADC sample values. The level comparator 304 indicates that a sample is greater than the set level threshold. The consecutive zero detector 304 indicates consecutive zero samples are received from the ADC 220. Thermal asperity detector 202 of the invention identifies a TA event by counting the number of consecutive samples exceeding the programmable level threshold setting for the level comparator 302 that are not consecutive zero samples. A control block 306 uses the level comparator output and the consecutive zero sample output information to increment, clear or hold the count value of a counter 308. The counter 308 is incremented by the control block 306 with each consecutive sample exceeding the programmable level that is not a consecutive zero sample. The count value of counter 308 is cleared or reset to a zero count by the control block 306 upon each sample not exceeding the programmable level. The count value of counter 308 is held for each consecutive zero level sample.

Figure 4:
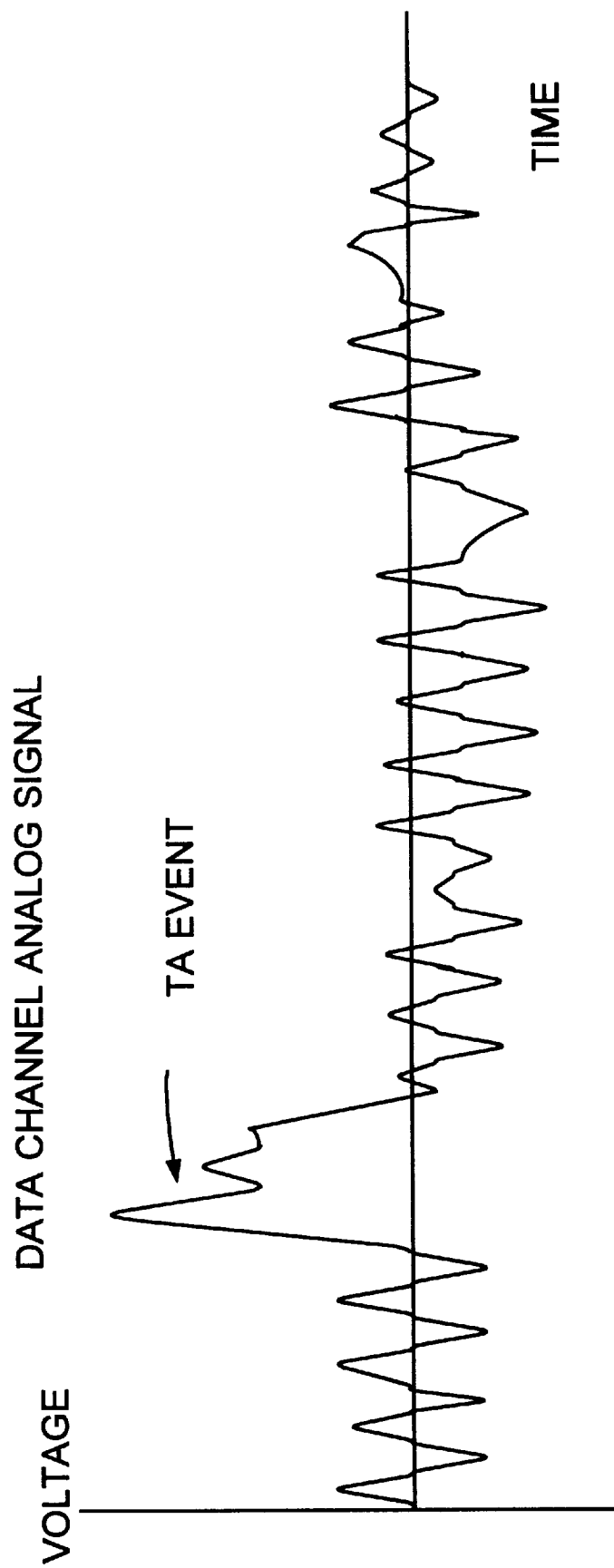
FIGS. 4, 5A, and 5B are charts illustrating an example of the operation of the thermal asperity detector of FIG. 3 in accordance with the present invention.

The ADC samples can be divided into three zones described as tri-level +1, 0, and −1, such as the target values of +1, 0 −1 for PR-IV data signals. The target value of 0 is identified for a sample that is greater than −0.5 and less than +0.5. The target value of +1 is identified for a sample that is greater than or equal to +0.5. The target value of −1 is identified for a sample that is less than or equal to −0.5. By preventing the counter 308 from incrementing on consecutive tri-level 0's (zeroes), the level threshold of the level comparator 302 can be set below the DC baseline without the detector 202 qualifying long magnets, as illustrated in FIGS. 4 and 5. A count comparator 310 receiving a programmable count threshold value is coupled to the counter 308. If count value of the counter 308 exceeds the programmable count threshold, a TA event is qualified by the count comparator 310.

As a result of the long magnet rejection enabled by the consecutive zero detector 304, both the level threshold for level comparator 302 and the count threshold for count comparator 310 can be set much more aggressively. As a result, thermal asperity detector 202 provides better detection of subtle TA events.

Figure 5A:
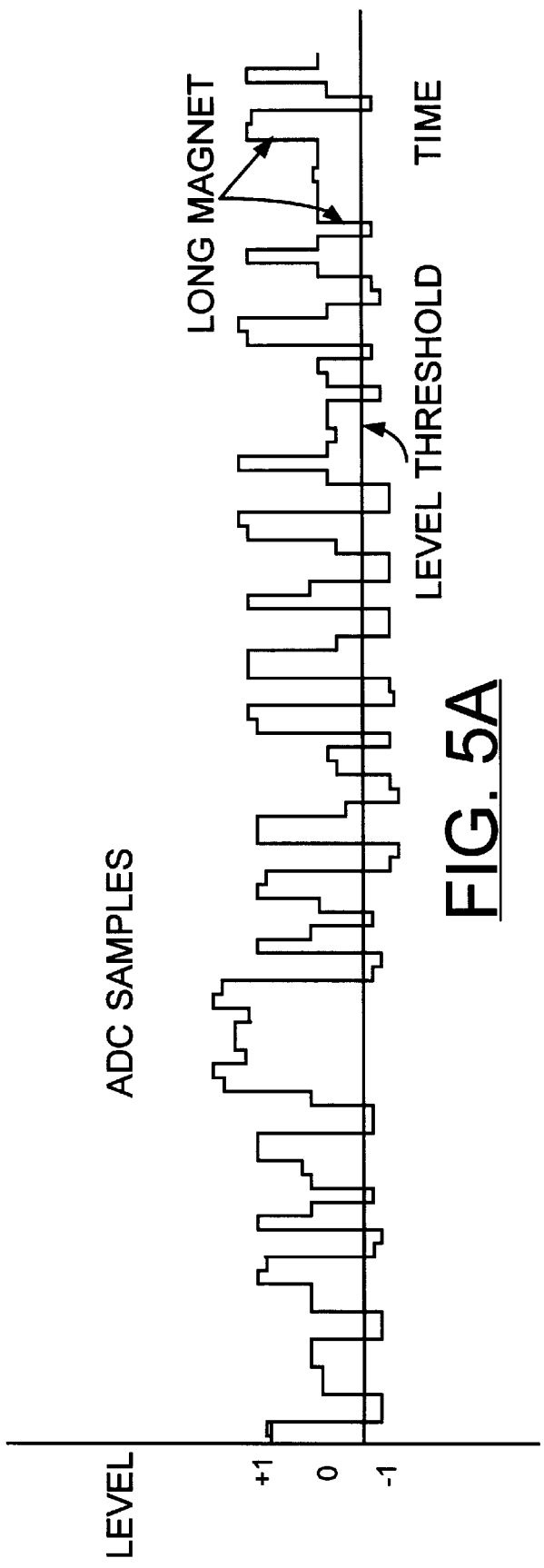
Figure 5B:

Referring now to FIGS. 4, 5A and 5B, operation of the thermal asperity detector 202 is illustrated. In FIG. 4, an analog input signal is illustrated with respect to the vertical axis with time indicated along the horizontal axis. In FIG. 5A, ADC samples are illustrated with respect to the vertical axis with time indicated along the horizontal axis. An example of the operation of the counter 308 and the thermal asperity detector 202 is provided in FIG. 5B. The counter values of the counter 308 of the thermal asperity detector 202 are shown for the illustrated ADC samples. Note that the counter values of the counter 308 indicate a TA event responsive to the illustrated TA event in the analog signal of FIGS. 4 and the ADC samples of FIG. 5A. As shown in FIG. 5B, the counter 308 is reset to 0 with each sample not exceeding the programmable level. Also note that the count value of counter 308 is held for each consecutive zero level sample.

It should be understood that the present invention is not limited to the illustrated thermal asperity detector 202 of FIG. 3. In a degenerate case of this detector method involves incrementing the counter 308 only on detected positive one sample values (+1's) and clearing the counter only on detected negative one sample values (−1's). The counter 308 remains unchanged on detected zero sample values (0's). In the absence of a TA, the readback signal is magnetically limited to a predetermined number of +1's before again seeing a −1. If this number is exceeded, a potential TA is identified. This detection method leads to an extremely efficient implementation since the level comparator 302 and consecutive zero detector 304 are eliminated and also because the count comparator 310 can be reduced.

While the present invention has been described with reference to the details of the embodiments of the invention shown in the drawing, these details are not intended to limit the scope of the invention as claimed in the appended claims.

What is claimed is:

1. A method for thermal asperity detection in a direct access storage device comprising the steps of:

receiving a data signal from a data channel in the direct access storage device;

utilizing a level threshold comparator, comparing data samples of said data signal with a selected level threshold;

detecting consecutive zero level data samples;

responsive to each identified data sample above said selected level threshold and not an identified consecutive zero level data sample, incrementing a counter value;

comparing said counter value with a predefined count threshold; and identifying a thermal asperity event responsive to said counter value above said predefined count threshold.

2. The method for thermal asperity detection in a direct access storage device as recited in claim 1 further includes the step of clearing said counter value responsive to an identified data sample below said selected level threshold.

3. The method for thermal asperity detection in a direct access storage device as recited in claim 1 includes the step of providing said selected level threshold below a zero level.

4. The method for thermal asperity detection in a direct access storage device as recited in claim 1 wherein said step of comparing said counter value with said predefined count threshold includes the step of providing a predetermined count threshold value to a count comparator being used for comparing said count values.

5. A method for thermal asperity detection in a direct access storage device comprising the steps of:

receiving a data signal from a data channel in the direct access storage device;

for each data sample of said data signal, detecting one of tri-level sample values of positive one, zero and negative one;

incrementing a counter value responsive to each detected positive one sample value;

clearing said counter value responsive to each detected negative one sample value;

comparing said counter value with a predefined count threshold; and identifying a thermal asperity event responsive to said counter value above said predefined count threshold.

6. Apparatus for thermal asperity detection in a direct access storage device comprising:

a level comparator and a consecutive zero detector receiving a data signal from a data channel in the direct access storage device;

said level threshold comparator for comparing data samples of said data signal with a selected level threshold;

said consecutive zero detector for detecting consecutive zero level data samples;

a counter control responsive to each identified data sample above said selected level threshold and not an identified consecutive zero level data sample, for incrementing a counter value;

a count comparator for comparing said counter value with a predefined count threshold; and said count comparator for identifying a thermal asperity event responsive to said counter value above said predefined count threshold.

7. Apparatus for thermal asperity detection in a direct access storage device as recited in claim 6 wherein said counter control responsive to each identified data sample below said selected level threshold for clearing said counter value.

8. Apparatus for thermal asperity detection in a direct access storage device as recited in claim 6 wherein said selected level threshold is a threshold level below a zero sample value level.

9. Apparatus for thermal asperity detection in a direct access storage device as recited in claim 6 wherein said counter control responsive to each identified consecutive zero level data sample for holding said counter value.

10. A direct access storage device (DASD) including a data channel comprising:

an analog-to-digital converter for receiving an analog data signal and providing sequential sample values;

a level comparator and a consecutive zero detector receiving said sequential sample values;

said level threshold comparator for comparing each said sequential data sample with a selected level threshold;

said consecutive zero detector for detecting consecutive zero level data samples;

a counter control responsive to each identified data sample above said selected level threshold and not an identified consecutive zero level data sample, for incrementing a counter value;

a count comparator for comparing said counter value with a predefined count threshold; and said count comparator for identifying a thermal asperity event responsive to said counter value above said predefined count threshold.

11. The direct access storage device (DASD) including a data channel as recited in claim 10 wherein said counter control is responsive to each identified data sample below said selected level threshold for clearing said counter value.

12. The direct access storage device (DASD) including a data channel as recited in claim 10 wherein said counter control responsive to each identified consecutive zero level data sample for holding said counter value.

* * * * *